OR 3,943,519

United Sta X343- 772

Bui-Hai

[11] 3,943,519

[45] Mar. 9, 1976

[54] MULTIPLEXER-DEMULTIPLEXER FOR A MICROWAVE ANTENNA

[75] Inventor: Nhu Bui-Hai, Paris, France

[73] Assignee: Thomson-CSF, Paris, France

[22] Filed: Mar. 6, 1975

[21] Appl. No.: 555,815

[30] Foreign Application Priority Data

Mar. 8, 1974 France .............................. 74.07927

[52] U.S. Cl. ...................... 343/176; 333/6; 343/756

[51] Int. Cl.[2] ............................................ H04L 5/00

[58] Field of Search ...................................... 325/24; 343/175–180, 755, 756, 762, 772, 775, 860; 333/6, 21 R, 73 W

[56] References Cited

UNITED STATES PATENTS

| | | | |
|---|---|---|---|
| 3,234,555 | 2/1966 | Petrilla et al. | 343/175 |
| 3,566,309 | 2/1971 | Ajioka | 333/6 |
| 3,668,564 | 6/1972 | Ren et al. | 333/6 |
| 3,731,235 | 5/1973 | Ditullio et al. | 343/176 |
| 3,731,236 | 5/1973 | Ditullio et al. | 343/756 |
| 3,816,835 | 6/1974 | Hai et al. | 343/176 |

*Primary Examiner*—Howard W. Britton
*Assistant Examiner*—Jin F. Ng
*Attorney, Agent, or Firm*—Cushman, Darby & Cushman

[57] ABSTRACT

A multiplexer-demultiplexer operates in the 3.6 to 4.2, 5.9 to 6.4, 6.4 to 7.1 and 10.7 to 11.7 kmc. The multiplexer-demultiplexer first picks off the signals of the first frequency band, and thereafter separates the signals of the fourth frequency band from other frequency bands, comprising the second and third frequency band, of the input signals, all these operation being performed for each one of the vertical and horizontal polarizations. The aforesaid other frequencies bands are thereafter separated according to polarization only before it is demultiplexed according to frequency.

6 Claims, 6 Drawing Figures

343/100+ see (11) note only claims waveguides Antenna couplers filters etc

MULTIPLEXER-DEMULTIPLEXER FOR A MICROWAVE ANTENNA

The present invention relates to improvements in the multiplexer-demultiplexer for microwave antennas, which forms the object of the U.S. Pat. No. 3,816,835, which improvements are designed to make it possible to transmit a larger number of frequency bands.

The multiplexer-demultiplexer which forms the object of the U.S. Pat. No. 3,816,835, is designed to transmit frequencies comprised between 3.6 and 4.2 kmc and between 5.9 and 7.1 kmc.

The multiplexer-demultiplexer described in the U.S. Pat. No. 3,816,835 comprises, on the one hand, starting from the port intended for connection to the radiating section of the antenna:

in a series arrangement, two directional couplers ensuring total coupling in the frequency band from 3.6 to 4.2 kmc respectively for the V and H polarizations and a polarizer having a port (which is its "input port" where demultiplexing is concerned) coupled to the second directional coupler. This multiplexer-demultiplexer comprises on the other hand:

two waveguides, each with a stub, the two waveguides having their first ends respectively coupled to the two polarization ports of the polarizer; a first and a second Y-junction, coupled by their first ports respectively to the second ends of said waveguides; a first band-pass filter coupled to the second port of the first Y-junction, and a second band-pass filter coupled to the second port of the second Y-junction.

An antenna equipped with this kind of multiplexer-demultiplexer makes it possible to operate simultaneously in three frequency bands:

the complete band from 3.7 to 4.2 kmc, using the two polarizations V and H;

The half-band from 5.9 to 6.4 kmc, using the two polarizations V and H;

the half-band from 6.4 to 7.1 kmc, using the two polarizations V and H.

The multiplexer-demultiplexer which forms the object of the present invention, has been improved in particular in order to allow it to effect simultaneous transmission of at least four frequency bands.

These four frequency bands comprise, in addition to the three bands above mentioned (bands 4 kmc, 6 kmc and 7 kmc), either a band from 10.7 to 11.7 kmc, or that from 1.7 to 2.1 kmc or a band comprised between 7.1 and 7.7 kmc.

In accordance with another improvement, the multiplexer-demultiplexer is given a modular design making it possible to modify the choice of the bands which are transmitted.

The invention will be better understood and other of its features rendered apparent, from a consideration of the ensuing description and the related drawings where:

Figure 1:
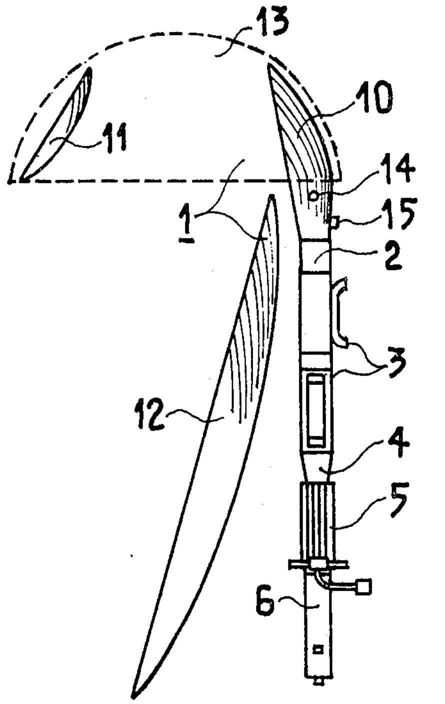
FIG. 1 is a schematic view of an antenna comprising a multiplexer-demultiplexer in accordance with the invention; in this view, part of the elements have been omitted in order not to overburden the drawing.

In the claims, and also very generally, in the specification, in order to facilitate the description, the bands of frequencies comprised between 1.7 and 2.1 kmc, between 3.7 and 4.2 kmc, between 5.9 and 6.4 kmc, between 6.4 and 7.1 kmc, between 7.4 and 7.7 kmc and between 10.7 and 11.7 kmc, will be respectively termed the 2 kmc, 4 kmc, 6 kmc, 7 kmc, 7.5 kmc and 11 kmc bands. It should be understood, furthermore, that these frequency bands are ones which are defined by the CCIR (International Radio Consultative Committee) standards, and that, for example, the 7.5 kmc band in fact extends from 7.425 kmc to 7.725 kmc.

FIG. 1 illustrates an antenna, with its radiating section 1 and its multiplexer-demultiplexer 2, 3, 4, 5, 6. The radiating section 1, which is of the offset Cassegrain type, comprises a primary source 10, an auxiliary reflector 11 and a main reflector 12. The base of the primary source forms part of the multiplexer-demultiplexer to the extent that, as a description of FIG. 2 to be given later on will show, two of the ports, 14, 15, used for the multiplexing-demultiplexing function, communicate with the primary source 10.

The radiating section 1 must be of very wide-band type since it must pass frequencies ranging from 1.7 to 11.7 kmc, with especially good radiation characteristics. To this end, a radiating section of the reflector horn type can be used or, as FIG. 1 shows, a radiating section of the offset Cassegrain type equipped with a protective hood 13 only the outline of which has been shown in FIG. 1. The protective hood associated with this radiating section, is designed, in particular, to absorb parasitic radiations; the hood is lined internally with a material which absorbs electromagnetic waves, and it surrounds the primary source 10 and the auxiliary reflector 11 not laterally but also at the side opposite the main reflector 12.

The multiplexer-demultiplexer comprises, starting from the primary source:

a junction 2 between a circular-section waveguide and a square-section waveguide;

a directional coupler device 3;

a connection system 4;

a directional coupler system 5 which, in the ensuing description and in the claims, will be referred to as a double directional coupler;

a polarization separator-mixer, 6, often referred to as a polarizer.

The multiplexer-demultiplexer also comprises frequency separator-mixers coupled to the polarizer; these frequency separator-mixers have not been shown in FIG. 1, in order to enable the double directional coupler 5 to be seen, but will be described with the help of FIGS. 4 and 5.

Figure 2:
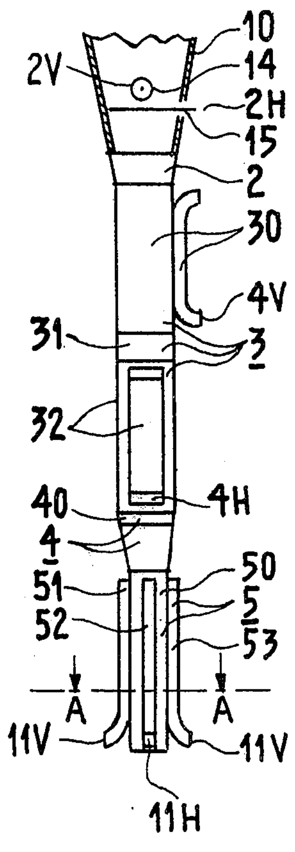
FIGS. 2 to 5 are diagrams of elements of the antenna illustrated in part in FIG. 1.

FIG. 2 illustrates that part of the multiplexer-demultiplexer of FIG. 1, which is located between the base of the primary source 10 and the double directional coupler 5.

Into the sectioned, frustoconical section of the primary source 10, there extend two coaxial probes 14 and 15. These probes are arranged at 90° to one another at a location of the primary source 10 where the waisting of the frustoconical section of said source is such that vis-a-vis the 2 kmc band a short-circuit is formed. The position of these probes should be determined experimentally on the basis of an approximate position determined by calculation. The terminals of the probes 14 and 15 respectively constitute ports 2V and 2H of the multiplexer-demultiplexer, that is to say the ports corresponding to the V and H polarizations of waves whose frequencies fall within the band from 1.7

– 2.1 kmc.

The junction 2 between the circular-section waveguide and the square-section waveguide, this linking the primary source 10 with the directional coupler 3, contains a mode filter whose function is to suppress the $TM_{21}$ and $TM_{12}$ modes which are likely to develop at this location; this mode filter is formed by nickel-chrome plated glass resistors.

As FIG. 2 shows, the directional coupler 3 comprises, connected in sequence:

a first directional coupler 30, effecting total coupling in the 4 kmc band and formed by a secondary rectangular-section waveguide and a main waveguide whose square section is designed to pass all frequencies commencing from the 4 kmc band upwards. The magnetic coupling between the main waveguide and the secondary waveguide is effected across holes formed in the wall common to the two waveguides. The coupler 30 is designed for operation with V polarization in the 4 kmc band, its demultiplexing output (or multiplexing input) being marked 4V in FIG. 2;

a mode filter 31 designed to prevent the development of the $TM_{21}$ and $TM_{12}$ modes;

a second directional coupler 32, identical to the first and arranged in extension thereof; the two couplers 30 and 31 are rotated through 90° in relation to one another about the axis which coincides with that of their main waveguide; thus the multiplexing output 4H of this second coupler is a port for the H polarization in the 4 kmc band.

In FIG. 2, there can also be seen the assembly 4 which links the directional coupler 3 to the double directional coupler 5; this assembly comprises, in sequence;

a mode filter 40 designed to prevent the development of the $TM_{21}$ and $TM_{12}$ modes, and a junction 41 between a square-section waveguide and a circular-section waveguide.

The double directional coupler 5 shown in FIG. 2 is composed of a cylindrical waveguide 50, 34mm in diameter, and of four rectangular-section waveguides only three, 51, 52, 53 of which, can be seen in the drawing; these waveguides are closed at one end on matched loads and are disposed longitudinally around the cylindrical waveguide 50, with an interval of 90° between their axes. The magnetic coupling between the cylindrical waveguide 50 and each of the four rectangular waveguides, is effected across holes formed parallel to the axis of the cylindrical waveguide 50 in the wall which is common to the cylindrical waveguide and the considered rectangular waveguide. The position and diameter of the holes as well as the dimensions of the cylindrical waveguide 50 and the four rectangular waveguides, are designed to ensure that the double directional coupler 5 acts as a directional coupler for the 11 kmc band, this in respect of both polarizations, hence the name of double coupler.

The four rectangular waveguides of the directional coupler 5, define four ports arranged opposite one another in pairs for the polarizations V and H of the 11 kmc bands: two opposite ports 11 V and two opposite ports 11 H.

Figure 3:
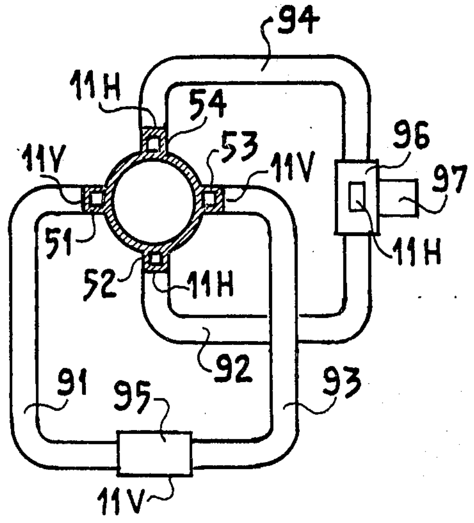

FIG. 3 illustrates, in section on the line AA (see FIG. 2), the directional coupler 5 of FIG. 2; this drawing also shows how on the one hand the two ports 11 V of the rectangular waveguides 51, 53, and on the other the two ports 11 H of the rectangular waveguides 52, 54, are coupled. From the two ports 11 H of the directional coupler 5, there extend two rectangular waveguides 92, 94 which are bent and coupled across a magic-Tee 96; the third port of this magic-Tee forms the port 11 H of the multiplexer-demultiplexer and, to the fourth port of the magic-Tee, a matched load 97 is connected. Similarly, the two ports 11 V of the directional coupler 5 are coupled by two bent waveguides 91, 93 and a magic-Tee 95 comprising a matched load, and whose third port forms port 11 V of the multiplexer-demultiplexer.

It might be thought that it would be more normal and simpler, working from the multiplexer-demultiplexer in accordance with the parent patent, to arrange the double directional coupler for the 11 kmc band, between the radiating section of the antenna and this original multiplexer-demultiplexer, the cylindrical waveguide section of this double direction coupler then having to be given a diameter such that it will pass all the frequencies from 3.7 kmc onwards; this gives rise to the formation, in particular in the 11 kmc band, of several parasitic modes and these parasitic modes prevent proper operation of the multiplexer-demultiplexer. It might also seem a possibility to form the 11 kmc band couplers by means of rectangular waveguides placed side by side with free faces of the main waveguides of the 4 kmc band couplers, and coupled to said main waveguides for example by means of regularly spaced holes; however, in that case again, for reasons which are associated with parasitic modes and questions of matching, the results obtained would not be satisfactory.

The idea which has led to the arrangement of the double directional coupler between the 4 kmc band coupling device and the polarizer, has made it possible to curtail these drawbacks by substantially reducing the diameter of the circular-section waveguide of the double directional coupler, this being possible since the waveguide now only has to pass frequencies from 5.9 kmc upwards.

Figure 4:
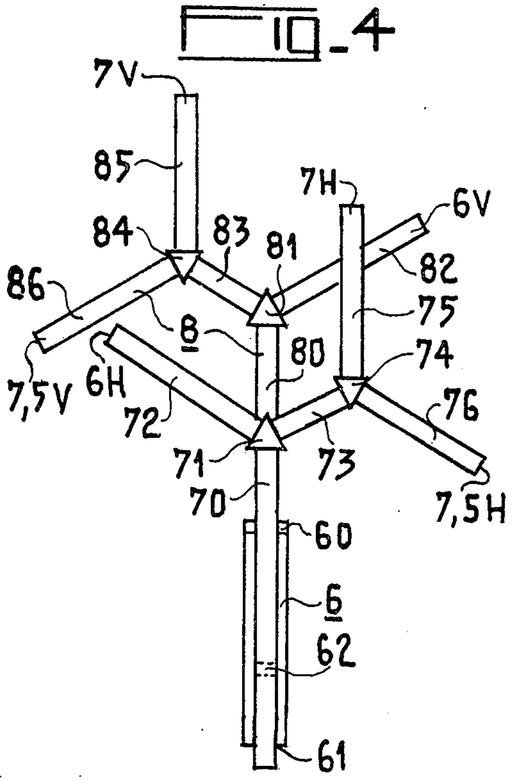
Figure 5:
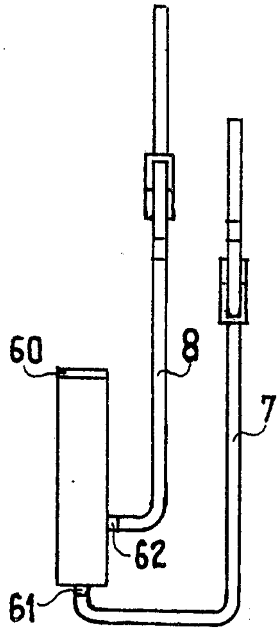

FIGS. 4 and 5 illustrate, looking from the front and the side, the polarizer 6 of FIG. 1 as well as two frequency separator-mixers 7 and 8. The polarizer 6 is designed to operate at frequencies ranging from 5.9 to 7.7 kmc; it has three branches 60, 61, 62 which, in the following description, will be referred to respectively as the common branch, the H polarization branch and the V polarization branch.

The common branch 60 is the branch which, in the multiplexer-demultiplexer, is connected to one end of the cylindrical waveguide of the directional coupler 5.

To the H polarization branch 61 there is coupled a first frequency separator-mixer 7 which comprises:

a waveguide 70 whose first end is coupled to the H polarization branch; this waveguide contains a matching network and a compensating stub which are adjusted for the frequency band comprised between 6.2 and 7.7 kmc;

a Y-junction, 71, coupled by the first of its three ports to the second end of the waveguide 70;

a filter 72 adjusted for the half-band of frequencies from 6.2 to 6.4 kmc; this filter is coupled by the first of its ends to the second port of the Y-junction 71 and comprises an isolator at its second end; the isolator is designed to provide better matching of the impedance of that port of the filter 72 which is located opposite the Y-junction 71;

a waveguide 73 whose first end is coupled to the third port of the Y-junction 71; this waveguide comprises a matching network and a compensating stub which are adjusted for the frequency band ranging from 6.7 to 7.7 kmc;

- a Y-junction 74 coupled by the first of its three ports to the second end of the waveguide 73,
- two filters 75, 76 respectively coupled by their first ends to the second and third ports of the Y-junction 74, and respectively passing the half-bands covering the frequencies 6.7 – 7.1 kmc, and 7.6 – 7.7 kmc; the filter 75 has an isolator at its second end.

To the V polarization branch 62 of the polarizer 6, there is coupled a second frequency separator-mixer 8, the component elements of which are arranged in a manner similar to those of the frequency separator-mixer 7 and carry the same references, augmented by 10; the elements 80, 82, 83, 85, 86 of this second frequency separator-mixer 8, are respectively adjusted for the frequency intervals 5.9 – 7.6 kmc, 5.9 – 6.2 kmc, 6.4 – 7.6 kmc, 6.4 – 6.7 kmc, and 7.4 – 7.6 kmc.

The second ends of the six filters 72, 75, 76 and 82, 85 86, therefore respectively form the multiplexer-demultiplexer ports for the following half-bands:

- 6.2 – 6.4 kmc, H polarization (port marked 6 H in FIGS. 4 and 5)
- 6.7 – 7.1 kmc, H polarization (port marked 7 H in FIGS. 4 and 5)
- 7.6 – 7.7 kmc, H polarization (port marked 7.5 H in FIGS. 4 and 5)

and

- 5.9 – 6.2 kmc, V polarization (port marked 6 V in FIGS. 4 and 5)
- 6.4 – 6.7 kmc, V polarization (port marked 7 V in FIGS. 4 and 5)
- 7.4 – 7.6 kmc, V polarization (port marked 7.5 V in FIGS. 4 and 5)

This breakdown of frequencies in which, to one of the separator-mixers, 7, there are assigned the upper half-bands, and to the other, 8, the lower half-bands, contributes, despite the proximity of the 6 kmc, 7 kmc and 7.5 kmc bands, to the achievement of good quality in the link established by the antenna.

It should be noted that each of the band or half-band ports of the multiplexer-demultiplexer described, can be operated either in the transmission or in the reception mode, without restriction, except in the case of the ports of the frequency separator-mixers; indeed it is desirable, in order to achieve optimal operation, that one of these separator-mixers should operate in the transmission mode and the other in the reception mode.

Figure 6:
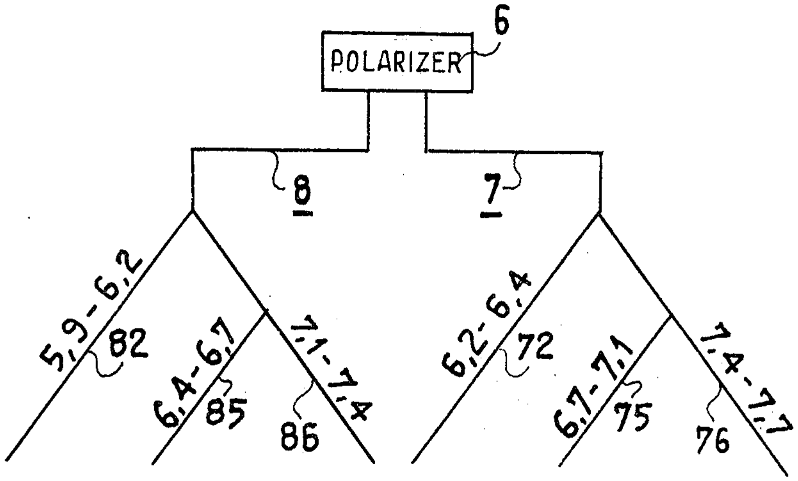
FIG. 6 is a diagram illustrating a variant embodiment of FIG. 4.

FIG. 6 is a diagram illustrating the modifications which can be made to the multiplexer-demultiplexer hereinbefore described, in order to add the 7.1 – 7.4 kmc band.

The polarizer 6 remains unchanged, but the filters 76 and 86 of the frequency separator-mixers 7, 8, are modified in order to transmit the whole of the band from 7.1 to 7.4 kmc with one polarization, and the whole of the band from 7.4 to 7.7 kmc with the other polarization. The extreme frequency values to be passed by each of the filters, are indicated on FIG. 6, for example 7.1 – 7.4 kmc in the case of the filter 86.

It is also possible to modify the elements of the device described, and in fact the magic-Tees 95, 96 of FIG. 3, could be replaced by Y-junctions. Similarly, the probes 14, 15 of FIG. 2 could be replaced by circular-section waveguides; in this case, the short-circuit plane is produced by the use of grids which are opaque vis-a-vis frequencies in the 2 kmc band and transparent vis-a-vis higher frequencies.

It should be noted, furthermore, that the various elements of the multiplexing-demultiplexing device can be designed in a modular form in order that they can be assembled in quasiarbitrary fashion with one another, this making it possible, without the need to create new components, to provide an item of equipment capable of performing multiplexing-demultiplexing in 1, 2, 3, 4, 5 or 6 frequency bands.

By way of indication, in an embodiment corresponding to the diagram of FIG. 1, the multiplexer-demultiplexer, without that of its sections comprised in the base of the primary source, has a height of around 2.2m and the complete antenna has a height of around 5.3m.

Of course, the invention is not limited to the embodiments described and shown which were given solely by way of example.

What is claimed is:

1. A multiplexer-demultiplexer for a microwave antenna designed to transmit signals in first, second, third and fourth frequency bands respectively comprised between 3.6 and 4.2 kmc, 5.9 and 6.4 kmc, 6.4 and 7.1 kmc and 10.7 and 11.7 kmc, said multiplexer-demultiplexer comprising: a coupling arrangement for receiving vertical and horizontal polarization signals and having a first port for coupling to an antenna, and a second port; a first directional coupler having a first port coupled to said second port of said coupling arrangement, and second and third ports and a second directional coupler having a first port coupled to said third port of said first directional coupler, and second and third ports, one of said directional couplers being designed to transmit to its second port the whole of the signals having a predetermined one of the two polarizations in said first frequency band applied to its first port, and the whole of the signals having the one of the two polarizations in said first frequency band applied to its first port together with the signals in said second, third and fourth bands applied to its first port to its third port, and the other of said directional couplers being designed to transmit to its second port the whole of the signals having said other one of the two polarizations in said first frequency band applied to its first port, and the signals in said second, third and fourth bands applied to its first port to its third port; a double directional coupler having a first port coupled to said third port of said second directional coupler, and second, third and fourth ports, said double directional coupler being designed to transmit to its second and third ports, respectively, the horizontally polarized signals and the vertically polarized signals in said fourth frequency band applied to its first port, and the signals in said second and third bands applied to its first port to its fourth port; and a polarizer having first and second polarization ports, and a further port coupled to said fourth port of said double directional coupler; said multiplexer-demultiplexer further comprising two waveguides each of which is provided with a stub, said two waveguides having respective first ends respectively coupled to said first and second polarization ports of said polarizer and respective second ends; first and second Y-junctions having respective first ports respectively coupled to the second ends of said two waveguides, each of said Y-junctions having two further ports; a first band-pass filter having a first port coupled to one of said further ports of said first Y-junction; and a second band-pass filter having a first port coupled to one of said further ports of said second Y-junction.

2. A multiplexer-demultiplexer for a microwave antenna, as claimed in claim 1, wherein said double directional coupler comprises: a main circular waveguide having a wall and two ends respectively forming its first and fourth ports; four rectangular waveguides arranged longitudinally around said main waveguide, with intervals of 90° between their axes, each of said four rectangular waveguides having two ends and a wall, provided with holes, which is common with part of the wall of said main circular waveguide; said four rectangular waveguides forming two pairs of opposite waveguides, the two waveguides of one pair being coupled by one of their two ends to said second port of said double directional coupler and the two waveguides of the other pair being coupled by one of their two ends to said third port of said double directional coupler.

3. A multiplexer-demultiplexer for a microwave antenna as claimed in claim 1, further designed for passing a fifth frequency band comprised between 7.1 and 7.7 kmc and further comprising a first filtering arrangement having a first port coupled to the other one of said further ports of said first Y-junction and a second filtering arrangement having a first port coupled to the other one of said further ports of said second Y-junction; said first filtering arrangement comprising: a first further waveguide provided with a stub, and having a first end coupled to the other one of said further ports of said first Y-junction, and a second end; a first further Y-junction having a first port coupled to the second end of said first further waveguide, and second and third ports; and third and fourth band-pass filter respectively coupled to said second and third ports of said first further Y-junction; said second filtering arrangement comprising: a second further waveguide provided with a stub, and having a first end coupled to the other one of said further ports of said second Y-junction, and a second end; a second further Y-junction having a first port coupled to the second end of said second further waveguide, and second and third ports; and fifth and sixth band-pass filters respectively coupled to said second and third ports of said second further Y-junction; and wherein said second, third and fifth frequency bands being respectively subdivided into a lower sub-range and a higher sub-range, said first, second, third, fourth, fifth and sixth band-pass filters are designed for respectively passing the lower sub-range of said second frequency band, the higher sub-range of said second frequency band, the lower sub-range of said third frequency band, the lower sub-range of said fifth frequency band, the higher sub-range of said third frequency band and the higher sub-range of said fifth frequency band.

4. A multiplexer-demultiplexer for a microwave antenna, as claimed in claim 1 wherein said multiplexer-demultiplexer of built in modular form.

5. A multiplexer-demultiplexer for a microwave antenna as claimed in claim 1, comprising means located in said antenna for, in a demultiplexing operation, picking off 1.7–2.1 kmc band power, before it reaches said first port of said coupling arrangement.

6. A multiplexer-demultiplexer as claimed in claim 5, for a microwave antenna having a 1.7 – 2.1 kmc band short-circuit plane, and wherein said means comprises two probes located at 90° to one another in said short-circuit plane.

* * * * *